United States Patent [19]
Barrett et al.

[11] 3,991,017
[45] Nov. 9, 1976

[54] ION EXCHANGE RESINS DERIVED FROM HYBRID COPOLYMERS

[75] Inventors: James H. Barrett, Cornwells Heights; David H. Clemens, Willow Grove, both of Pa.

[73] Assignee: Rohm and Haas Company, Philadelphia, Pa.

[22] Filed: Oct. 15, 1974

[21] Appl. No.: 514,878

Related U.S. Application Data

[63] Continuation-in-part of Ser. No. 426,760, Dec. 20, 1973, abandoned, which is a continuation-in-part of Ser. No. 26,046, April 6, 1970.

[52] U.S. Cl. ............................ 260/2.1 R; 260/2.1 E; 260/2.1 M; 260/865; 260/870; 260/873; 260/875; 260/885; 260/886; 260/901
[51] Int. Cl.² ................... C08F 12/08; C08F 12/36; C08F 16/00; C08F 2/00
[58] Field of Search........... 260/2.1 R, 2.1 E, 2.1 M, 260/2.2 R, 865, 870, 873, 875, 885, 886, 901

[56] References Cited
FOREIGN PATENTS OR APPLICATIONS
728,508  4/1955  United Kingdom
1,116,800  6/1968  United Kingdom
124,111  11/1959  U.S.S.R.

Primary Examiner—Murray Tillman
Assistant Examiner—T. DeBenedictis, Sr.
Attorney, Agent, or Firm—Louis F. Kline, Jr.

[57] ABSTRACT

Hybrid copolymers are prepared by at least partially filling the macropores of a macroreticular ion exchange resin with a gel type, crosslinked copolymer of either the same monomers or a copolymer of different type monomers. The hybrid copolymers can be readily converted into ion exchange resins. Such resins have markedly improved physical and chemical properties, including improved ion exchange properties.

14 Claims, No Drawings us application is a continuation-in-part application
ION EXCHANGE RESINS DERIVED FROM HYBRID COPOLYMERS This application is a continuation-in-part application of our earlier filed and copending U.S. application Ser. No. 426,760, filed Dec. 20, 1973, now abandoned, and entitled "Hybrid Copolymers and Ion Exchange Resins which case in turn was a Continuation-in-part application of an earlier-filed copending U.S. Patent, Ser. No. 26046, filed April 6, 1970, and entitled "Hybrid Copolymers and Ion Exchange Resins".

This invention relates to novel hybrid copolymers prepared, for example, by adding a polymerizable monomer, a cross-linking agent, and a free radical initiator to a stirred mixture of a macroreticular copolymer and water. The macroreticular copolymer absorbs or imbibes the monomer mixture and polymerization can be achieved thermally.

As is well known, ion exchange resins or copolymers are generally divided into two classes:
1. those which are essentially non-porous and which are generally known as gel copolymers, and
2. those which are porous or macroreticular.

Each class of copolymers when converted to or prepared in the form of ion exchange resins, that is by the introduction of or in situ formation of suitable functionality offers certain distinct advantages. For example, strong base resins prepared from macroreticular copolymers generally show an increase in physical stability and exchange kinetics relative to resins prepared from similar gel copolymers which generally exhibit a higher column capacity.

There are numerous techniques that can be used to prepare the hybrid copolymers and hybrid resins, which term, incidentally, has been coined to distinguish the novel copolymers of the present invention from the gel and macroreticular copolymers and resins of the prior art. The "hybrid" terminology indicates that the resins have some of the characteristics and/or properties of both gel and macroreticular copolymers and resins but, more importantly, they represent a new and novel class of material having distinct properties of their own. One general approach for preparing these copolymers is to at least partially fill the pores of a macroreticular copolymer or resin with gel copolymer utilizing varying percentages of crosslinking agent and introducing such gel copolymer, or gel copolymer forming components, in varying amounts. Alternatively, the hybrid copolymers can be prepared by filling the pores of a macroreticular copolymer with additional macroreticular copolymers in varying amounts and with varying crosslinker contents or percentages or by varying the amount of phase extender. It is also possible to prepare the hybrid resins by filling the hybrid resins or copolymers with functionalized copolymers, e.g., by using a monomer such as 2-vinylpyridine-4-vinylpyridine, acrylic acid, methacrylic acid, etc.

The base or host copolymer possesses a special porous structure which is referred to herein as macroreticular. Macroreticular copolymers possess a network of microscopic channels extending through the mass and while these microscopic channels are obviously very small, they are large in comparison with the pores in conventional homogeneous crosslinked gels, pores of the latter type not being visible in electron photomicrographs and, as is well known, not being true pores at all (vide Kunin, "Ion Exchange Resins" page 45, et.seq. John Wiley & Sons, Inc. 1958). Typically, macroreticular polymers have a surface area of at least 1 sq. meter per gram, and more generally at least 5 sq. meters per gram and have pores larger than about 15 to 20 A Units. It is conventional to produce these macroreticular polymers in bead form, usually in an overall particle size of about 10 to 900 microns. Further information on the preparation and structure of macroreticular polymers, which are known materials, may be obtained by referring to British Pat. No. 932,125 and 932,126 and U.S. Pat. Nos. 3,275,548 and 3,357,158.

The macroreticular and gel type copolymers and resins, per se, and the resins containing ion exchange functional groups have been described in the prior art. In general, similar types of monomeric materials are used in preparing the macroreticular, and gel type resins, while the preparation process is varied to impart different characteristics, especially different porosity, to the different types of resins. When macroreticular or gel type components are used in the preparation of the hybrid copolymers and hybrid resins of the present invention, the nature of the polymer which comprises the backbone of the resin is relatively unimportant, the only requirement being that the resin for ion exchange ultimately contain suitable functional groups. However, in general, the backbone of these resins and thus the backbone of the hybrid resin as well, will be a crosslinked copolymer of (1) a polyunsaturated monomer, containing a plurality of non-conjugated $CH_2 = C<$ groups, which acts as a crosslinking agent and (2) a monoethylenically unsaturated monomer, either aromatic or aliphatic. If desired, the polymer can comprise essentially all of (1).

Suitable polyunsaturated crosslinking agents include divinylbenzene, divinylpyridine, divinyltoluenes, divinylnaphthalenes, diallyl phthalate, ethylene glycol diacrylate, ethylene glycol dimethacrylate, trimethylolpropane trimethacrylate, neopentyl glycol dimethacrylate, bis-phenol A dimethacrylate, pentaerythritol tetra- and trimethacrylates, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'- methylenediacrylamide, N,N'methylene dimethacrylamide, N,N'-ethylenediacrylamide, trivinylbenzene, trivinylnaphthalene, polyvinylanthracenes and the polyallyl and polyvinyl ethers of glycol glycerol, pentaerythritol, resorcinol and the monothio or dithio derivatives of glycols.

Preferred crosslinking monomers for both the macroreticular phase or base copolymer and the gel fill include polyvinyl aromatic hydrocarbons, such as divinylbenzene and trivinylbenzene, glycol dimethacrylates and polymethacrylates, such as ethylene glycol dimethacrylate, trimethylolpropane trimethacrylate, and polyvinyl ethers of polyhydric alcohols, such as divinoxyethane and trivinoxypropane. The amount of crosslinking agent or monomer can be varied widely. In the case of anion-exchange resins the total utilizable capacity of the final resin as an anion-exchange resin generally decreases with an increase in the amount of crosslinking agent, and an amount of about 1/2% to about 30%, and preferably about 3 to 10%, on a weight basis is usually adequate. However, for other purposes and for cation exchange resins the crosslinking level can be significantly higher, i.e., up to about 50% by weight or even higher based on the total weight of the monomers.

Suitable monoethylenically unsaturated monomers for both the macroreticular base or host addition copolymer and addition gel copolymer fill include esters of acrylic acid, such as methyl acrylate, ethyl acrylate, propyl acrylate, isopropyl acrylate, butyl acrylate, tert-butyl acrylate, ethylhexyl acrylate, cyclohexyl acrylate,, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxyethyl acrylate, propoxypropyl acrylate, ethoxyphenyl acrylate, ethoxybenzyl acrylate, ethoxycyclohexyl acrylate, the corresponding esters of methacrylic acid styrene, o-, m- and p-methyl styrenes, and o-, m-, and p-ethyl styrenes, vinyl naphthalene, vinyl toluene and dimethyl itaconate. A class of monomers of particular interest consists of vinyl aromatic monomers such as styrene and the esters of acrylic and methacrylic acid with a $C_1$-$C_{10}$ aliphatic alcohol.

The polymerization reaction is generally carried out in the presence of a catalyst. Suitable catalysts which provide free radicals to function as reaction initiators include benzoyl peroxide, t-butyl hydroperoxide, lauroyl peroxide, cumene hydroperoxide, tetralin peroxide, acetyl peroxide, caproyl peroxide, t-butyl perbenzoate, t-butyl diperphthalate methyl ethyl ketone peroxide.

The amount of peroxide catalyst required is roughly proportional to the concentration of the mixture of monomers. The usual range is 0.01% to 5% by weight of catalyst with reference to the weight of the monomer mixture. The optimum amount of catalyst is determined in large part by the nature of the particular monomers selected, including the nature of the impurities which may accompany the monomers.

Another suitable class of free-radical generating compounds which can be used as catalysts are the azo catalysts, including for example, azodiisosbutyronitrile, azodiisobutyramide, azobis($\alpha$, $\alpha$-dimethylvaleronitrile), azobis($\alpha$-methyl-butyronitrile) dimethyl, diethyl, or dibutyl azobis(methyl-valerate). These and other similar azo compounds, which serve as free radical initiators, contain an -N=N- group attached to aliphatic carbon atoms, at least one of which is tertiary. An amount of 0.01% to 2% of the weight of monomer or monomers is usually sufficient.

In making the gel type copolymers and resins and the hybrid copolymers and resins containing the gel copolymers and resins, a wide variety of polymerization conditions and processes well known in the art can be used. However, the preferred method is suspension polymerization in a liquid, such as water, which is not a solvent for the monomeric material. This method produces the polymer directly in the form of small spheroids or beads, the size of which can be regulated and controlled. By adjustments in the composition of the suspending medium and in the rate of agitation during polymerization, the suspension polymerization process can be made to produce spheroids or beads of a wide range of effective particle sizes.

In preparing the base macroreticular copolymer or resin, and likewise in preparing a hybrid copolymer or resin which may contain a macroreticular fill of lesser cross-linkage content, the polymerization reaction is carried out in the presence of a precipitant which is a liquid (a) which acts as a solvent for the monomer mixture and is chemically inert under the polymerization conditions and (b) which is present in such amount and which exerts so little solvating action on the product cross-linked copolymer that phase separation of the product copolymer takes place as evidenced by the fact that the product copolymer is no more than semi-transparent and is preferably opaque when associated with a fluid having a different refractive index.

The determination of the most effective precipitant and the amounts required for the formation of a particular copolymer may vary from case to case because of the numerous factors involved. However, although there is no "universal" or single class of precipitants applicable to all cases, it is not too difficult to determine which precipitants will be effective in a given situation. The requirements of solubility with the monomer mixture and low solvating action on the product copolymer can be tested empirically and the solubilities of many monomers and copolymers are well known from publications and textbooks. A swelling type solvent can be used, however, provided that the cross-linker level is sufficiently high.

As a further guide in the selection of a suitable precipitant, reference may be made to scientific literature, for instance, as discussed in Hildebrand and Scott, Solubility of Non-Electrolytes, 3d., N.Y., 1950. In general, it may be stated that sufficiently wide differences in the solubility parameters of copolymer and solvent, respectively, must exist for the precipitant to be effective and that, once an effective precipitant has been located, the behaviour of many other liquids can be predicted from the relative position of the reference polymer and precipitant in published tables, within the accuracy of such published information. Furthermore, if the solubility parameter of a given polymer occupies an intermediate position in these tables, solvents with both higher or lower parameters may become effective.

A minimum concentration of any particular precipitant is required to effect phase separation. This is comparable to the observation that many liquid systems containing two or more components are homogenous when some components are present in only minor amounts; but, if the critical concentration is exceeded, separation into more than one liquid phase will occur. The minimum concentration of the precipitant in the polymerizing mixture will have to be in excess of the critical concentration. The amounts in excess of such critical concentration can be varied and they will influence to some extent the properties of the product so formed.

Too high a concentration of the precipitant may be undesirable for practical reasons since the rate of copolymerization may decrease and the space-time yields become low. In many cases, the amount of precipitant employed may be between 25 percent and 60 percent by weight of the total weight of the monomer mixture and the precipitant.

The amount of precipitant liquid required to effect phase separation varies inversely with the degree of cross-linking of the copolymer so that the greater the cross-linker content the lesser is the amount of precipitant employed.

As stated above, the chemical character of the precipitant may vary appreciably, depending on the monomer mixture which is used. When employing aromatic hydrocarbon type monomers, such as, for instance, styrene and divinylbenzene, alkanols with a carbon atom content of from 4 to 10 will, if sufficient crosslinker is used, effect the desired phase separation when used in amounts of from about 30% to 50% of the total weight of monomers and precipitant.

Saturated aliphatic hydrocarbons containing at least 7 carbon atoms, such as heptane and isooctane, may be employed as precipitants for aromatic hydrocarbon systems, such as styrene and divinylbenzene. Also, cyclohexane may be employed. The amounts employed can be varied, depending on the degree of cross-linkage, from 30% to 50% of the total weight of the monomers and precipitant.

When employing acrylic esters as the monounsaturated monomers, alkyl esters can be effectively employed as precipitant. Typical esters include n-hexyl acetate, 2-ethylhexyl acetate, methyl oleate, dibutyl sebacate, dibutyl adipate and dibutyl carbonate. The esters must have a carbon atom content of at least 7. The concentrations required will vary somewhat with the ester being used and with the amount of cross-linking monomer but from 30% to 50% by weight based on the combined weight of the monomers and the precipitant will generally cause the desired phase separation and the formation of a macroreticular structure within the polymerized mass.

Higher aliphatic hydrocarbons containing at least 7 carbon atoms, such as heptane and isooctane, may be employed as precipitants when employing acrylic esters as the monoethylenically unsaturated monomers. The amounts employed can be varied from 25% to 50% based on the combined weight of monomers and precipitant.

Many polymerization methods can be used in preparing the macroreticular resins and the hybrid resins as well. The preferred method, however, is suspension polymerization. In this case, an additional factor must be considered, namely, the solubility, i.e., miscibility, of the precipitant in the suspending medium. Since suspension polymerization of most ethylenically unsaturated monomers is generally conducted in aqueous media, most frequently it is the water-solubility of the precipitant which must be considered. While precipitants with water-solubilities as high as 20 grams per 100 grams of water can be employed, a low water-solubility is preferred because of handling ease, ease of recovery, and processing economies. As is well known, however, it is possible to decrease the water-solubilities of compounds by adding salts to the aqueous phase and this method also may be employed to decrease the water-solubilities of a precipitant liquid. The general position is that, when suspension polymerization is used, the precipitant must be either immiscible or only partially miscible with the suspending medium.

Other suitable methods for preparation of the macroreticular resins are disclosed in U.S. Pat. Nos. 3,275,548 and 3,357,158.

As noted hereinabove the terms "hybrid copolymers" or "hybrid resins" have been coined to denote materials obtained by a multi-stage polymerization technique. In general, the term hybrid copolymers refers to the novel materials of this invention before the introduction or creation of any significant amount or quantity of ion-exchange functional groups. The term hybrid resins or hybrid ion-exchange resins generally refers to the hybrid copolymers in their converted or functionalized form, i.e., after treatment of the hybrid copolymers to introduce suitable ion-exchange functional groups or after incorporating functionalized monomers. The same materials, catalysts, proportions and polymerization techniques, particularly the suspension polymerization technique, referred to above with reference to the precursor macroreticular copolymers and the gel-type copolymers are used in making the finished hybrid copolymers or hybrid resins. The hybrid ion-exchange resins of the present invention, in which the pores of the macroreticular copolymer are filled with a lightly crosslinked gel copolymer, do in fact combine the high capacity of the gel resin with the stability of the macroreticular resin. The hybrid copolymer is prepared by adding fresh monomer such as, for example, styrene, catalyst, and a suitable crosslinking agent such as divinylbenzene to a suspension of a macroreticular copolymer and water. The monomer is adsorbed or imbibed into the pores of the macroreticular copolymer, and the imbibed monomer is polymerized within the macroreticular copolymer beads by heating the mixture and thereafter ion exchange functional groups are introduced to the polymer complex thus formed. Not only do the resulting resins show a greater combination of capacity and stability than one obtains with a macroreticular resin and a gel resin, but also there are significant improvements in leakage and pressure drop over the corresponding macroreticular and gel type resins. While there has undoubtedly been prior work involving multistage polymerization copolymers and resinous materials designed as ion exchange resins, the present polymer systems differ from anything known or disclosed in the prior art in the following respects: the first-stage polymer or the precursor macroreticular copolymer can furnish, if desired, substantial ion exchange properties in its own right in contrast to the inert inorganic carriers or porous polymers (PVC, PE) of the prior art, thus leading to superior total capacity in the final product. Also, the base macroreticular copolymer can be converted in whole or in part to an ion exchange resin by the introduction of suitable functional groups before the gel polymer or differently crosslinked macroreticular copolymer is added to the pores of the base or first stage polymer. The monomer which is to be sorbed or imbibed into the base macroreticular copolymer, herein designated as the second-stage monomer merely for ease of reference, is deposited within the pores of the substrate and no interaction with the substrate is sought although some interaction would not necessarily be harmful or undesirable. In any event, the final compositions are still heterogeneous. Thus, while some swelling on the polymer body cannot be excluded, no groups or treatments promoting grafting efficiency are generally provided or even deemed necessary. At higher levels of crosslinking in the first-stage polymer, inbibing is probably therefore due to capillary effects and the products are not interpenetrating networks as described in parts of the prior art. The hybrid resins may, therefore, be considered heterogeneous products characterized by two relatively independent phases which cooperate in providing superior ion exchange capacity, particle stability, improved leakage characteristics, and other advantageous factors.

Other advantageous factors include, unexpectedly good hydraulic and good pressure drop characteristics, particularly, (1) for hybrid resins which contain a gel phase which may be lightly crosslinked, e.g., with as little as 1/2% crosslinker, and still have excellent properties, for example, in sugar decolorization, see Example 12, and Table IV infra, or (2) for hybrid resins which contain a lightly crosslinked macroreticular phase and which still have outstanding leakage characteristics, see, for example, Example 11, and Table III, infra. This is rather surprising since lightly crosslinked resins are sometimes very soft and virtually unusable in many industrial applications.

The relative amounts of gel phase polymer and macroreticular host or base copolymer can be varied over a wide range. It is desirable, however, to use at least 5 parts by weight of gel forming components (gel copolymer) per 100 parts by weight of macroreticular base or host polymer, with the maximum amount being dictated by that amount which can be imbibed or retained in or on the macroreticular base structure. This maximum will ordinarily be about 300 parts by weight of gel copolymer per 100 parts by weight of base polymer, although higher amounts can also be used. Preferably, the amounts of gel copolymer to macroreticular base will be in the range of about 10 to 200 parts of gel copolymer per 100 parts of macroreticular polymer, and more preferably, about 25 to 100 parts of gel copolymer per 100 parts of macroreticular host base polymer, all parts being on a weight basis.

The following examples will further illustrate the invention but are not intended to limit it. In the examples, as well as in the other parts of the specification and claims, parts and percentages are by weight unless otherwise stated. Mesh measurements are U.S. Standard Sieve unless otherwise stated. All chemicals used are of good commercial quality. In the case of divinylbenzene (DVB) a good commercial grade is used which contains about 56% active material, i.e., pure DVB, the balance being essentially all ethyl vinyl benzene. The copolymers set forth below are in bead form and are prepared by suspension or pearl polymerization techniques. Porosity is reported as per cent porosity or as the volume of pores per dry volume of resin, usually as milliliter per milliliter (ml./ml.). Percent porosity can be obtained by multiplying this value by 100. All temperatures given in the examples are in ° C. unless otherwise stated.

EXAMPLE 1 a. Preparation of Starting Copolymer (Macroreticular)

To a three-liter, three-necked flask equipped with stirrer, a thermometer, and a reflux condenser is added 1.15 g. of sodium chloride, 1.5 g. of purified gelatin in 50 ml. of water, 10 g. of sodium polyacrylate (12.5% solids) in 100 ml. of water, and 500 ml. of water with stirring. The stirring speed is adjusted to ~ 145 rpm and after solution was achieved the stirrer was stopped and 400 g. of a 3% DVB*-styrene solution, 261.2 g. of methylisobutylcarbinol (MIBC) and 5.0 g. of benzoyl peroxide are added. The mixture is stirred at 145 rpm until a suitable dispersion is achieved and is heated at 80° for 11 hrs. The MIBC is removed by distillation while maintaining a constant fluid level by the gradual addition of water. The mixture is cooled to room temperature, and the copolymer is isolated and washed on a Buchner funnel. The resulting copolymer product is dried at 125° for 8 hrs. to give a 70% yield of −20 +70 mesh beads and is identified as Resin A in Table I below. The copolymer product has a porosity of 0.56 ml./ml. and a crosslinker level of 3% DVB. After chloromethylation and amination the copolymer is converted into a strongly basic anion exchange resin with a column capacity of 9 Kgr./ft.$^3$, as $CaCO_3$, and a porosity of 0.2 to 0.4

*DVB = divinylbenzene Type Resin b. Strong Base Gel Type Resin

A strong base gel type anion exchange resin, having a styrene-DVB matrix, is prepared in conventional manner. The gel resin has a column capacity of 12.0 Kgr./ft.$^3$ as $CaCO_3$, a porosity of 0.0 and a DVB crosslinker level of 2%. The product is identified as Resin B in Table I.

EXAMPLE 2 a. Preparation of Hybrid Copolymer

In a one-liter, three-necked flask equipped with an efficient stirrer, a condenser, and a thermometer is placed 52 g. of a 3% divinylbenzene (DVB, 58.9% active)-styrene macroreticular copolymer (0.71 porosity, 30-60 mesh) and 400 ml. of tap water. To this mixture is added 50 g. of a 0.5% DVB-styrene solution in which is dissolved 0.5 g. of benzoyl peroxide. The resulting mixture is stirred rapidly at room temperature for one hour and at 80° for a total reaction time of 20 hours. The mixture is allowed to cool to room temperature and the resulting beads are isolated by filtration, washed with 600 ml. of methanol, and dried to a constant weight in a steam oven (75°). The hybrid copolymer is used directly in the following chloromethylation procedure. The yield of hybrid copolymer is 99.4 g. (97.5%).

b. Chloromethylation of Hybrid Copolymer

In a one-liter, three-necked flask equipped with a mechanical stirrer, a condenser with a drying tube attached, a thermometer, and a dropping funnel is placed 52 g. of the above hybrid copolymer and 240 ml. of 1,2-dichloroethane (EDC). The mixture is stirred slowly for 30 min. allowing the beads to swell. To the swollen beads is added 95 g. of chloromethyl methyl ether (CME) in one portion. The reaction mixture is cooled to 0° by means of an ice bath and 26.8 g. of aluminum chloride dissolved in 26 g. of CME is added dropwise over a one hour time period while maintaining the temperature below 5°. The mixture which resulted is heated at 40° for 16 hours and is cooled to −10° with the use of an ice-methanol bath. The cooled slurry is poured into 600 ml. of anhydrous methanol while maintaining the temperature below 10°. The mixture is stirred for 30 min., the liquid layer is removed with a filter stick, and the resulting beads are given two 30 min. washes with 600 ml. portions of absolute methanol to give the product as tan uncracked beads which are used directly in the following aminolysis.

c. Aminolysis of the Chloromethylated Intermediate

In a one-liter, three-necked flask equipped with a mechanical stirrer, a thermometer, and a gas diffusion tube are placed the chloromethylated intermediate prepared as described above. Methanol (250 ml.) is added and the mixture is brought to pH 8 with 10% sodium carbonate. To the basic mixture is added 40 g. of trimethylamine (TMA) by means of a gas diffusion tube while maintaining the temperature below 15° with an ice bath. After the addition is complete the reaction is stirred at room temperature overnight. The unreacted TMA and the methanol are removed by distillation while maintaining a constant fluid level by the gradual addition of water. The reaction mixture is cooled and the product is backwashed to neutrality and isolated by filtration. The product had an average DVB content of 2.02%; solids - 42.3%; anion exchange capacity - 4.22 meq./g. of dry resin; reversible swelling - 17.8%; column capacity at a 5 gal./ft.$^3$/min. flow rate - 10.2 kgr.ft.$^3$; whole bead content after two acid-base cycles with 1N HCl and 1N NaOH - 98%; cracked bead content - 7%.

EXAMPLE 3 a. Preparation of Hybrid Copolymer

In a one-liter, three-necked flask equipped with an efficient stirrer, a condenser, and a thermometer is placed 52 g. of a 3% divinylbenzene (DVB, 58.9% active)-styrene macroreticular copolymer (30-60 mesh, 0.71 porosity) and 400 ml. of tap water. To this mixture is added with rapid stirring 100 g. of a 0.5% DVB-styrene solution in which is dissolved 1.0 g. of benzoyl peroxide. The mixture is stirred rapidly for 1 hour during which time the added monomer mixture is absorbed by the initial preformed porous copolymer. The reaction mixture is then heated for 20 hours at 80°. The mixture is cooled, and the copolymer is isolated by filtration, washed with 600 ml. of methanol, and dried in a steam oven (75°) until a constant weight of copolymer is achieved to give 150 g. (98.7%) of product.

b. Chloromethylation of Hybrid Copolymer

In a one-liter, three-necked flask equipped with a mechanical stirrer, a condenser to which is attached a drying tube, a dropping funnel, and a thermometer is placed 52 g. of the hybrid copolymer described above. The beads are swollen in 300 ml. of 1,2-dichloroethane (EDC) for 30 min. and 95 g. of chloromethyl methylether (CME) is added. The mixture is cooled below 10° with an ice bath and 26.8 g. of aluminum chloride in 26 g. of CME is added dropwise over a one hour period. The mixture is warmed between 35°-40° overnight and is cooled to 0° by means of an ice-methanol bath. The resulting beads are washed once with 600 ml. of EDC and three times with 600 ml. portions of methanol. The resulting chloromethylated product is used directly in the following aminolysis.

c. Aminolysis of the Chloromethylated Intermediate

In a one-liter, three-necked flask equipped with an efficient stirrer, a thermometer, a condenser, and a gas diffusion tube is placed the chloromethylated intermediate described above. Methanol (300 ml.) is added and the mixture is brought to pH 8 with 10% aqueous sodium carbonate. Trimethylamine (TMA 40 g.) is added below the surface of the liquid by means of the gas diffusion tube over a period of 2 hours. The reaction mixture is heated to 35°-40° overnight and the unreacted TMA and methanol are removed by distillation while maintaining a constant liquid level in the flask by the gradual addition of tap water. The resulting product is backwashed to neutrality and is isolated by filtration. The product has an average DVB content of 1.35%; solids 41.1%; anion exchange capacity - 4.33 meq./g. of dry resin; reversible swelling 17.0%; column capacity at a 2 gal./ft.$^3$/min. flow rate - 10.6 kgr./ft.$^3$; whole bead content after two acid-base cycles with 1N HCl and 1N NaOH - 100%; cracked bead content - 5%.

EXAMPLE 4 a. Preparation of Hybrid Copolymer

A 3% divinylbenzene (DVB)-styrene macroreticular copolymer (107.7 g.) having a porosity of 0.56 is suspended in 800 ml. of tap water in a two-liter, three-necked flask equipped with a mechanical stirrer, a reflux condenser, and a thermometer. To the rapidly stirred mixture is added in one portion a 0.5% DVB-styrene solution (30 g.) containing benzoyl peroxide (1.37 g.). The resulting mixture is stirred at room temperature for 55 minutes and is heated at 80° for a total reaction time of 22 hours. The reaction mixture is cooled and the product is isolated by filtration, rinsed with methanol, and dried in a steam oven (75°) to a constant weight to give 134.1 g. (97.8%) of white opaque beads. Effective size: before, .322; after, .346.

b. Chloromethylation of Hybrid Copolymer

In a two-liter, three-necked flask equipped with a mechanical stirrer, thermometer, and a condenser to which is attached a drying tube was placed 107 g. of the hybrid copolymer prepared as described above and 350 ml. of 1,2-dichloroethane (EDC). The mixture is stirred for 5 min., 241.5 g. of chloromethyl methyl ether was added, and the resulting mixture is cooled to 0° by means of an ice bath. Aluminum chloride is added over a two hour period while maintaining the reaction temperature at 0°. Upon completion of the addition the reaction mixture is heated at 35° for 24 hours. The mixture is cooled and the liquid phase is removed by means of a filter stick. The crude product is washed with 600 ml. of EDC for 30 min. followed by 3 × 600 ml. washes with methanol. This material is used directly without further purification in the aminolysis described below. Calculated % Cl: 22.96; Found: 20.4.

c. Aminolysis of the Chloromethylated Intermediate

To the chloromethylated intermediate described above is added 250 ml. of anhydrous methanol and enough 20% sodium carbonate (~10 ml.) to bring the mixture to pH 8. To the basic slurry is added 75 g. of anhydrous trimethylamine by means of a gas diffusion tube placed below the surface of the liquid while maintaining the reaction temperature between 5-10°. Upon completion of the addition the mixture was warmed to 35° for three hours. Excess TMA and methanol are removed by means of distillation using a Barrett trap while maintaining a constant volume by the addition of water. When the temperature of the reaction mixture reached 100° the reaction mixture is allowed to cool to room temperature. The resulting product is backwashed to neutrality with tap water. The final product has an average DVB content of 2.45%; solids - 38.5% anion exchange capacity - 4.25 meq./gm. of dry resin; density - 0.64 g./ml.; porosity - 0.044; reversible swelling - 20.8%; column capacity at a 5 gal./ft.$^3$/min. flow rate - 11.0 kgr./ft.$^3$; whole bead content after two acid-base cycles with 1N HCl and 1N NaOH - 100%; cracked bead content - 1%.

EXAMPLE 5 a. Preparation of Hybrid Copolymer

In a two-liter, three-necked flask equipped with a mechanical stirrer, reflux condenser, and a thermometer is placed 800 ml. of water and 107.6 g. of preformed macroreticular bead copolymer (−20 +60 mesh) having a porosity of 0.56. To the resulting mixture is added 60 g. of a 0.5% divinylbenzenestyrene solution containing 1.67 g. of benzoyl peroxide while rapid stirring is maintained. After 55 min. the reaction mixture is heated to 80° for a total reaction time of 22 hours. The reaction mixture is cooled to room temperature and filtered. The product is washed with 400 ml. of methanol and is dried in a steam oven for 4 hours to give 166.1 g. (99.1%) of white opaque beads. Effective size before polymerization, .322; after, .382.

b. Chloromethylation of Hybrid Copolymer

In a two-liter, three-necked flask equipped with a mechanical stirrer, thermometer, and a condenser to which is attached a drying tube is placed 107 g. of dry copolymer prepared as described above and 350 ml. of a 1,2-dichloroethane (EDC). The mixture is stirred slowly for 15 min. to allow the copolymer to swell. To the swollen copolymer is added 241.5 g. of chloromethyl methyl ether (CME) in one portion. The resulting mixture is cooled to 0° by means of an ice bath and 53.4 g. of aluminum cloride was added over a two hour period while maintaining the temperature at 0°. The reaction mixture is heated to 35° for 24 hours and the liquid layer is removed by means of a filter stick. The resulting beads were washed with 600 ml. portions of anhydrous methanol. Calculated % Cl: 21.3; Found: 21.0.

Aminolysis of the Chloromethylated Intermediate

The copolymer prepared in the manner described above is placed in a two-liter, three-necked flask equipped with a mechanical stirrer, condenser, and a gas inlet tube. The copolymer is slurried in 250 ml. of absolute methanol and brought to pH 8 with 20% aqueous sodium carbonate. The mixture is cooled to 5°–10° by means of an ice bath and 75 g. of trimethylamine (TMA) is added below the surface of the liquid in the flask. After addition the reaction mixture is heated to 35° for a period of 24 hours. The methanol and excess TMA are removed by distillation while maintaining a constant liquid level in the flask by the gradual addition of tap water. When the temperature in the reaction pot reaches 100° distillation is discontinued and the mixture is cooled to room temperature and backwashed to neutrality with tap water. The product has an average DVB content of 2.11%; solids - 38.5%; anion exchange capacity 4.43 meq./gm. of dry resin; density - 0.645 g./ml.; reversible swelling - 13.7%; column capacity at a 5 gal./ft.³/min. flow rate - 11.3 kgr./ft.³; whole bead content after two acidbase cycles with 1N HCl and 1N NaOH - 98%; cracked bead content - 13%.

EXAMPLE 6 a. Copolymer (Macroreticular)

A 3% divinylbenzene (DVB)-styrene macroreticular copolymer having a porosity of 0.56 which was used in the preparation of Example 5 and Example 4 is used directly without hybridization in the chloromethylation step described below.

b. Chloromethylation of Copolymer

In a two-liter, three-necked flask equipped with a mechanical stirrer, a condenser to which is attached a drying tube, and a thermometer is placed 107.6 g. of the copolymer described above and 650 ml. of 1,2-dichloroethane (EDC). The mixture is stirred for 5 min. and 241.5 g. of chloromethyl methyl ether was added and the resulting mixture is cooled to 5–10° over a 25 min. period by means of an ice bath. Aluminum chloride (53.4 g.) is added over a 2 hour period while maintaining the temperature between 5°–10°. The reaction mixture is heated at 35° for 24 hours and the liquid phase is removed with a filter stick. Half hour washes with one 600 ml. portion of EDC and 3 × 600 ml. portions of absolute methanol were used to purify the crude reaction product. Calculated % Cl: 23.1; Found 20.1.

c. Aminolysis of The Chloromethylated Intermediate

In a two-liter, three-necked flask equipped with a mechanical stirrer, a condenser, a gas diffusion tube, and a thermometer is placed the chloromethylated resin described above. Methanol (300 ml.) was added and the slurry was brought to pH 8 with 10% aqueous sodium carbonate. The resulting mixture was cooled to 0–10° and 75 g. of trimethylamine (TMA) is added below the liquid surface through the gas diffusion tube. Upon completion of the addition the reaction mixture is heated at 35° for 3 hours and is stirred at room temperature for 16 hours. The excess TMA and methanol are removed by distillation while maintaining a constant liquid level by the gradual addition of water. When the temperature reaches 100° distillation is discontinued, the reaction mixture is allowed to cool, and the product is backwashed to neutrality. The product has an average DVB content of 3.0% ; solids - 38.5%; anion exchange capacity - 4.25 meq./gm. of dry resin; density - .65 g./ml.; reversible swelling -20%; column capacity at a 5 gal./ft.³/min. flow rate - 9.65 kgr./ft.³; whole bead content after two acid-base cycles with 1N HCl and 1N NaOH - 100%; cracked bead content - 1.5%.

EXAMPLE 7 a. A strongly acidic, macroreticular cation exchange resin, having a styrene-DVB matrix, is prepared in a conventional manner. This resin has a column capacity of 12.0 kgr./ft.³ as CaCO₃, a porosity of 0.3–0.36 and a DVB cross-linker level of 20%. This product is identified as Resin C in Table II below.

b. A strongly acidic, gel type cation exchange resin, having a styrene-DVB matrix is prepared in conventional manner. This resin has a column capacity of 22 kgr./ft.³ as CaCO₃, a porosity of zero (0) and a DVB cross-linker level of 12%. This resin is identified in Table II below as Resin D. Neither Resin C nor Resin D has any imbibed monomer.

EXAMPLE 8 a. Preparation of macroreticular base or host copolymer

In a two-liter, three-necked flask equipped with a mechanical stirrer, condenser, thermometer, and a positive nitrogen flow is placed 500 g. of water and 1.5 g. of sodium. To this mixture is added 1.33 g. of gelatin dissolved in 30 ml. of water and 4.4 g. of sodium polyacrylate in 50 ml. of water. The mixture is stirred for 10 min. The stirring is stopped and a solution containing 350 g. of 20% divinylbenzene-styrene, 290 g. of methylisobutylcarbinol (MIBC) and 3.5 g. of benzoylperoxide is added in one portion. The mixture is heated and stirred for 16 hours at 80°. The MIBC is removed by distillation while maintaining a constant liquid level by the gradual addition of water. Upon completion of the distillation the reaction mixture is cooled and the product is isolated by filtration, washed with methanol and dried at 75° to a constant weight to give 336 g. (96%) of cross-linked macroreticular product having a porosity of about 0.54 ml./ml.

EXAMPLE 8 b. Control Sulfonation

In a one-liter, three-necked flask equipped with a stirrer, a thermometer and a Barrett trap to which is attached a condenser with a drying tube is added 52 g. of a 20% divinylbenzene (DVB)-styrene macroreticular copolymer, from Example 8 a) above, 16 g. of 1,2-dichloroethane, and 260 g. of 98% sulfuric acid in that order with stirring. The mixture is stirred at room temperature for 30 min., heated at 60° for the 1 hour (at this point 180 g. of additional sulfuric acid is added to maintain fluidity), and at 110° for 3 hours. While heating, approximately 7 ml. of EDC is collected in the trap. The product is quenched over a period of one hour while maintaining the temperature between 90° and 110°. The acid washings are siphoned to the top of the bead layer and the resulting beads are washed with successive 400 ml. portions of water until the washings are less than 3% sulfuric acid (5 washes). The beads are neutralized with a 25% excess of 10% sodium hydroxide (21.75 g. of NaOH) while maintaining the temperature below 30°. The basic beads are backwashed to neutrality with tap water. It is observed that relative to hybrid resins (Example 9 and Example 10, below) the beads are more highly fragmented. Initial whole bead content-5%; fragmented - 95%; 100% fragmented after one wet-dry cycle.

EXAMPLE 9 a. Preparation of Hybrid Copolymer

In a one-liter, three-necked flask equipped with a mechanical stirrer, thermometer, and condenser is placed 52 g. of a 20% divinylbenzene (DVB)-styrene macroreticular copolymer from Example 8 a) above and 400 ml. of tap water. To this mixture is added with rapid stirring 30 g. of a 4% DVB-styrene solution in which is dissolved 0.3 g. of benzoyl peroxide. The mixture is stirred for one hour during which time the preformed copolymer absorbed the added monomer mixture. The mixture is heated at 80° for 16 hours and the product is isolated by filtration, washed with 600 ml. of methanol and dried in a steam oven (75°) to a constant weight to give 81 g. (98.9%) of opaque white beads.

b. Sulfonation of Hybrid Copolymer

To 50 g. of hybrid copolymer, prepared as described above, in a one-liter, three-necked flask equipped with a stirrer, thermometer, and a Barrett trap to which is attached a condenser with a drying tube is added 16 g. of 1,2-dichloroethane and 260 g. of sulfuric acid in that order. The reaction mixture is stirred at room temperature for 30 min., at 60° for 1 hour, and at 110° for 3 hours. During this time ca. 8 ml. of EDC distilled into the Barrett trap. The reaction mixture is cooled to 90° and 300 ml. of water is added over a period of 30 min. while maintaining the temperature below 110°. The aqueous phase is removed to the bead surface by means of a filter stick and 300 ml. of water is added to one portion. The product is washed with 3 × 400 ml. portions of water and is neutralized with 10% aqueous sodium hydroxide. The excess caustic is removed by backwashing the sample to neutrality. The product contains 98% whole uncracked beads. After one wet-dry cycle the product contained 98% whole beads and 5% cracked beads; salt splitting cation capacity −4.25 meq./gm of dry resin; solids −52.2%; reversible swelling −4.5%; column capacity at a 2 gal/ft$^3$/min. flow rate −22.1 kgr./ft.$^3$; porosity − 0.43; average % DVB − 14.1.

EXAMPLE 10 a. Preparation of Hybrid Copolymer

In a one-liter, three-necked flask equipped with a mechanical stirrer, thermometer, and condenser is placed 52 g. of a 20% DVB-styrene macroreticular copolymer and 400 g. of tap water. To this mixture is added 60 g. of a 4% DVB-styrene solution in which was dissolved 0.6 g. of benzoyl peroxide. The resulting mixture is stirred rapidly for 30 min. and the temperature is brought to 80°, and held there for 20 hours. The product is isolated by filtration, washed with methanol, and dried to a constant weight in a steam oven (75°) overnight to give 107.5 g. (96%) of material.

b. Sulfonation of Hybrid Copolymer

In a one-liter, three-necked flask equipped with a mechanical stirrer, a Barrett trap to which is attached a reflux condenser, and a thermometer is placed 50 g. of the hybrid copolymer prepared in the manner described above. To the copolymer is added 16 g. of 1,2-dichloroethane (EDC) and 260 g. of 99% sulfuric acid. The mixture is stirred for 30 min. at room temperature, for one hour at 60°, and 3 hours at 110°. During this time 7.8 ml. of EDC is collected. The reaction mixture is cooled to 90° and 300 ml. of water is added over a period of 30 min. while maintaining the temperature below 110°. THe liquid is siphoned to the bead level and 400 ml. of water is added in one portion. The mixture is stirred for 15 min. and the process is repeated three times. The resulting product is made basic with excess 10% sodium hydroxide while keeping the temperature below 50° and the excess base is removed by backwashing. The product contained 99% whole and uncracked beads; appearance after one wet-dry cycle - 99% whole beads, 28% cracked beads; salt splitting cation capacity - 4.15 meq./g. of dry resin; solids - 55.1%; reverisble swelling - 20.7%; porosity - 0.13; average % DVB - 11.4.

TABLE I

| | | | | Column*** Capacity Kilograms (Kgr.) as CaCO$_{Kilograins}$ per | | | | |
|---|---|---|---|---|---|---|---|---|
| Resin Sample | Copolymer (host or control) | Imbibed Monomer gms. | % DVB | ft. 3 of Resin | Porosity | Appearance Before | After | Total % DVB |
| Resin A | styrene-DVB (3%) | — | — | 9 | 0.2–0.4 | 100/0/0 | 98/0/2 | 3 |

TABLE I-continued

PROPERTIES OF STRONG BASE ION EXCHANGE RESINS

| Resin Sample | Copolymer (host or control) | Imbibed Monomer gms. | Imbibed Monomer % DVB | Column*** Capacity Kilograms (Kgr.) as CaCO$_{Kilograins}$ ft.$^3$ of Resin | per Porosity | Appearance Before | Appearance After | Total % DVB |
|---|---|---|---|---|---|---|---|---|
| Resin B | cross-linked MR* copolymer with porosity of 0.56 ml./ml. styrene-DVB (2%) gel copolymer | — | — | 12.0 | 0 | 100/0/0 | 2/98/0 | 2 |
| Hybrid Resins Example 2 | styrene-DVB (3%) cross-linked MR copolymer with porosity of 0.71 ml./ml. | 50 | ½ | 10.2 | 0.02 | 99.5/0/.5 | 99.5/0/.5 | 1.8 |
| Example 3 | " | 100 | ½ | 10.6 | 0.00 | 100/0/0 | 99.8/0.2/0 | 1.4 |
| Example 4 | styrene-DVB (3%) cross-linked MR copolymer with porosity of 0.56 ml./ml. | 30 | ½ | 11.0 | 0.04 | 100/0/0 | 99/1/0 | 2.5 |
| Example 5 | " | 60 | ½ | 11.3 | 0.01 | 97/1.5/1.5 | 85/13/2 | 2.1 |
| Example 6 | " | — | | 9.6 | 0.15 | — | — | 3.0 |

*MR — macroreticular
**Appearance — represents untouched whole beads, cracked beads, and fragmented beads in that order both before and after acid base cycling. In acid base cycling the resin is contacted with 1N HCl for ½ hour, rinsed with water, then contacted with 1N NaOH for ½ hour and rinsed with water for one complete cycle. A 20–30 mesh cut is used.
***Column Capacity — reported at a regeneration level of 4 lbs. NaOH/cu.ft. of resin. Regeneration with 1N NaOH and a flow rate of 1 gal./cu.ft./minute. Exhaustion with 500 ppm HCl at a flow rate of 2 gal./cu.ft./minute.

TABLE II

PROPERTIES OF STRONG ACID ION EXCHANGE RESINS

| Resin Sample | Copolymer (host or control) | Imbibed Monomer gms. | Imbibed Monomer % DVB | Column*** Capacity Kgr. as CaCO$_3$ per ft.$^3$ of resin | porosity | Appearance** Before | Appearance** After | Total DVB |
|---|---|---|---|---|---|---|---|---|
| Resin C | styrene DVB (20%) cross-linked MR* copolymer with porosity of 0.35–0.4 ml./ml. | — | — | 12.0 | 0.3–0.36 | 100/0/0 | 99/1/0 | 20 |
| Resin D | styrene-DVB (12%) gel copolymer with zero porosity | — | — | 22.0 | 0 | 77/19/4 | 56/22/22 | 12 |
| Hybrid Resins Example 8 | styrene-DVB (20%) cross-linked MR copolymer with porosity of 0.54 | | | | 0.5 | 5/0/95 | 0/0/100 | 20 |
| Example 9 | " | 30 | ½ | 22.1 | 0.34 | 98/0/2 | 93/5/2 | 14.1 |
| Example 10 | " | 60 | ½ | 20.7 | 0.13 | 99/0/1 | 71/28/1 | 11.4 |

*MR-macroreticular
**Appearance - represents untouched whole beads, cracked beads, and fragmented beads in that order both before and after wet-dry cycling. In wet-dry cycling the beads are dried in an oven at 125° C. and then re-wet randily.
***Column Capacity - reported at a regeneration level of 10 lbs. NaCl/cu.ft. of resin. Regeneration with 10% NaCl at a flow rate of 1 gal./cu.ft./min. Exhaustion with 500 ppm of CaCl$_2$ at a flow rate of 2 gal./cu.ft./min.

In Table I, above, the properties of representative strong base hybrid ion exchange resins are compared with a similar macroreticular strong base resin (Resin A) and with a similar strong base gel resin (Resin B). It can be seen that the physical stability of the hybrid resins, i.e., the resins of Examples 2, 3, 4 and 5, as judged by the appearance before and after acid base cycling, is greatly improved relative to the gel resin, i.e., Resin B, and is at least as good in most instances, and in some instances better than the related macroreticular resin, i.e., Resin A. In addition, the column capacities of the hybrid ion exchange resins are significantly greater when compared with the macroreticular control, Resin A.

Table II illustrates a similar improvement in properties, namely physical stability and column capacity for hybrid strong acid (cation) ion exchange resins when compared with a similar gel type resin, Resin D, and a similar macroreticular resin, Resin C. It is particularly striking that the column capacities of the hybrid resins, e.g., resins of Examples 9 and 10 are almost double that of the counterpart macroreticular resin (Resin C) and in the case of Example 9 is even greater than a corresponding gel resin, e.g., Resin D.

EXAMPLE 11 a. Preparation of Hybrid Copolymer

In a one-liter, three-necked flask equipped with an efficient stirrer, a reflux condenser, and a drying tube is placed 100 g. of a 3% divinylbenzene (DVB)-styrene crosslinked macroreticular copolymer having a porosity of 0.56 and 300 ml. of tap water. The mixture is heated to 80° and a solution consisting of 100 g. of 8% DVB (55.9% active)-styrene monomer and 1 g. of benzoyl peroxide is added in one portion. The resulting mixture is stirred rapidly at 80° for three hours and at 95° for 2 hours. The beads are filtered, washed with methanol, and dried at 75° overnight to give 198.2 g. (99%) of product.

b. Sulfonation of Hybrid Copolymer

A two-liter, three-necked flask is equipped with a mechanical stirrer, thermometer, Barrett trap, and a condenser is charged with 100 g. of the hybrid copolymer described above in Example 11 a), 30 g. of 1,2-dichloroethane (EDC), and 600 g. of 99% sulfuric acid. The mixture is stirred at room temperature for 30 min., 60° for 1 hour, and 110° for 3 hours. During this time 16.2 ml. of EDC distilled into the Barrett trap. Water (300 ml.) is added over a 3 hour time period and 3000 ml. over an additional three hour (with periodic removal of excess washings) period. At the end of the quenchsiphon, the liquid is removed to the bead level and the beads are neturalized with 3 × 500 ml. portions of 5% sodium hydroxide. The product is backwashed to neutrality and is isolated by filtration. The resin exhibits a sodium leakage of 6.34% measured at 10 ppm above the lowest sodium leakage point (11.52 ppm); rinse requirements - 18.7 gal./ft.$^3$; solids - 43.8%; salt splitting cation capacity - 4.61 meq./g. of dry resin. The overall cross linker level is 5.5%.

EXAMPLE 11 c. Preparation of Hybrid Copolymer

In a one-liter, three-necked flask equipped with an efficient stirrer, a reflux condenser, and a drying tube is placed 100 g. of a 3% divinylbenzene (DVB)-styrene macroreticular copolymer, porosity 0.56, and 270 ml. of tap water. The mixture is heated to 80° and a solution consisting of 80 g. of 8% DVB (55.9% active)-styrene monomer and 0.8 g. of benzoyl peroxide is added in one portion. The resulting mixture is stirred rapidly at 80° for three hours and at 95° for 2 hours. The beads are filtered, washed with methanol, and dried at 75° overnight to give 178 g. of product.

d. Sulfonation of Hybrid Copolymer

A two-liter, three-necked flask equipped with a mechanical stirrer, thermometer, Barrett trap, and a condenser is charged with 100 g. of the hybrid copolymer (−20 +70 mesh), 30 g. of ethylene dichloride (EDC), and 603 g. of 96% sulfuric acid. The mixture is stirred at room temperature for 30 min., 60° for 1 hour, and 110° for 3 hours. 13.6 ml. of EDC is collected in the Barrett trap while heating to 110°. The reaction is quenched at 100°–110° using the following schedule: 2 ml./min. for 80 ml., 4 ml./min. for 200 ml., 8 ml./min. for 200 ml., and 10 ml./min. for 720 ml. The liquid is removed to the top of the bead layer by means of a filter stick and the beads are washed with 6 × 600 ml. portions of water. To the resulting product is added 500 g. of 10% sodium hydroxide while keeping the temperature below 35°. The resin in the sodium form is stirred for 30 min. and is backwashed to neutrality. The resin exhibits a sodium leakage of 4.15% with an end point taken at 10 ppm above the lowest sodium leakage point (5.65 ppm) rinse requirements - 12.1 gal./ft.$^3$; solids - 42.0%; salt splitting cation capacity - 4.60 meq./g. of dry resin.

EXAMPLE 11 (continued)

e. Preparation of Hybrid Copolymer

In a one-liter, three-necked flask equipped with an efficient stirrer, a reflux condenser, and a drying tube is placed 100 g. of a 2% divinylbenzene (DVB)-styrene macroreticular copolymer (porosity - 0.56) and 240 ml. of tap water. The mixture is heated to 80° and a solution consisting of 60 g. of 8% DVB (55.9% active)-styrene monomer and 0.6 g. of benzoylperoxide is added on one portion. The resulting mixture is stirred rapidly at 80° for 3 hours and at 95° for 2 hours. The product is isolated by filtration, washed with methanol, and dried at 75° to a constant weight to give 154.8 g. of beads.

f. Sulfonation of Hybrid Copolymer

The procedure followed was the same as that for 11 d). The resin exhibited a sodium leakage of 2.15% with an end point taken at 10 ppm above the lowest sodium leakage point (1.85 ppm); rinse requirements - 20.3 gal./ft.$^3$; solids - 40.1%; salt splitting cation capacity - 4.61 meq./g. of dry resin.

g. Another cation exchange resin, commercially available, having a small amount of porosity believed to be achieved by solvent leaching linear polymer from an intermediate gel material. The sodium leakage is 7.45%; solids 44.6%; SSCC - 4.67 meq./gm. of dry resin; lowest sodium leakage point - 14.78 ppm; rinse requirements - 80.9 gal./ft.$^3$. This product is manufactured by Diamond-Shamrock Company and is available under the tradename Duolite C-25D (Duolite Data Leaflet No. 25A lists the rinse requirements for C-25D as 20-30 gal./ft.$^3$).

h. A standard, commercially available, gel type strongly acidic exchange resin having a cross-linker level of 8% DVB shows a representative 12.84% sodium leakage when measured at 10 ppm above the lowest sodium leakage point.

The Table below, Table III, compares % sodium leakage for the various resins described in Example 11.

TABLE III

| Resin Sample | Sodium Leakage With Cation Exchange Resins[1] | | |
|---|---|---|---|
| | Cross-Linker Level, % | % Sodium[2] Leakage | Rinse Requirements gal/ft$^3$ |
| Example 11 b | 5.5 | 6.34 | 18.7 |
| Example 11 d | 5.2 | 4.15 | 12.1 |
| Example 11 f | 4.9 | 2.15 | 20.3 |
| Example 11 g | 6 | 7.45 | 80.9 |
| Example 11 h | 8 | 12.84 | 88.7 |

[1]The data represent the average of two runs and are expressed in terms of equivalent calcium carbonate
[2]Measured at 10 ppm above the lowest sodium leakage point Sodium leakage is determined, after placing the resin in the hydrogen ion form, by exhausting with a 500 ppm NaCL solution to a flow rate of 2 gal./min./cu.ft. of resin for the influent. The regenerant is H$_2$SO$_4$, 10 lbs. of regenerant/cu.ft. at a 1 gal./min. flow rate per cu. ft. of resin. Low sodium leakage is very desirable in ion exchange resins, particularly resins useful in water-treating applications. As is shown in Table III above, the ion exchange resins of the present invention, e.g., 11 *b*, 11 *d*, and 11 *f*, show a significant and distinct improvement in % sodium leakage value, as compared with a porous resin of the prior art, 11 g, and a gel type resin of the prior art, i.e., 11 h. Also, it should be noted that the rinse requirements are much less with resins of the present invention, 11 b, 11 d, and 11 f, than they are with the resins of the prior art, i.e., 11 g and 11 h.

EXAMPLE 12 a. Preparation of Hybrid Copolymer

In a two-liter, three-necked flask equipped with an effective stirrer, a condenser, and a thermometer is placed 107.6 g. of a 3% divinylbenzene (DVB) (55% active)-styrene macroreticular copolymer (−30 +60 mesh. Porosity 0.56) and 800 ml. of tap water. To this mixture is added 110 grams of a 0.5% DVB-styrene solution in which is dissolved 2.17 g. of benzoyl peroxide. The resulting mixture is stirred rapidly at room temperature for 1 hour and at 80° for a total reaction time of 22 hours. The mixture is allowed to cool to room temperature and the resulting beads are isolated by filtration, washed with 600 ml. of methanol and dried to a constant weight in a steam oven (75°). The hybrid copolymer is used directly in the following chloromethylation procedure. The yield of hybrid copolymer is 214.70 g. (98.5%).

b. Chloromethylation of Hybrid Copolymer

In a two-liter, three-necked flask equipped with a mechanical stirrer, a condenser with a drying tube attached and a thermometer was placed 106.03 g. of the above hybrid copolymer and 350 ml. of 1,2-dichloroethane (EDC). The mixture is stirred slowly for 10 minutes allowing the beads to swell. To the swollen beads is added 241.5 g. of chloromethyl ether (CME) in one portion. The reaction mixture is cooled to 0° by means of an ice bath and 53.36 g. of aluminum chloride was added over a two hour time period, while maintaining the temperature below 5°. The mixture which resulted is heated at 40° for 16 hours. The resulting beads are washed once with 600 ml. of EDC and three times with 600 ml. portions of anhydrous methane. The resulting chloromethylated product was used directly in the following aminolysis.

EXAMPLE 12 c. Aminolysis of the Chloromethylated Intermediate

In a two-liter, three-necked flask equipped with a mechanical stirrer, a thermometer, and a gas diffusion tube is placed the chloromethylated intermediate prepared as described above. Methanol (250 ml.) is added and the mixture is brought to pH 8 with 10% sodium carbonate. To the basic mixture is added 75 g. of trimethylamine (TMA) by means of a gas diffusion tube while maintaining the reaction temperature below 15° with an ice bath. After the addition is completed the reaction is stirred at room temperature overnight. The unreacted TMA and the methanol are removed by distillation while maintaining a constant fluid level by the gradual addition of water. The reaction mixture is cooled and the product is backwashed to neutrality and isolated by filtration. The product has an average DVB-content of 1.6 g.; solids - 52.43, anion exchange capacity 4.51 meq./g. of dry resin; reversible swelling - 14.5%; column capacity at a 5 gal./ft.$^3$/min. Flow rate - 10.5 Kgr./ft$^3$.

The following table, Table IV, shows the improvement in sugar decolorization that can be obtained with the novel hybrid ion exchange resins of the present invention.

TABLE IV

Sugar decolorization with Hybrid Resins

| Resin Sample | Weight Capacity (milliequivalents quat. ammonium functionality per gm. of dry resin) | % Sorp. of Color Bodies | % Sorp. of Color Bodies from Resin | Thru-put | Stability (after cycling) |
|---|---|---|---|---|---|
| Resin E[1] | 4.25 | 84.4 | 79.9 | 235 | 98/2/0 |
| Resin F[2] | 4.18 | 81.9 | 76.6 | 269 | 84/15/1 |
| Resin G[3] | 3.7 | 86.5 | 56.1 | 168 | 0/99/1 |
| Resin H[4] | 4.20 | 85.9 | 70.8 | 190 | 95/4/1 |

[1] hybrid resin 30 g. of 0.5% DVB - 99.5% styrene/mole of 0.56 porosity macroreticular base having quat. ammonium functionality prepared according to teachings of Example 4, above.
[2] hybrid resin 60 g. of 0.5% DVB - 99.5% styrene/mole of 0.56 porosity macroreticular base having quat. ammonium functionality prepared according to teachings of Example 12, above.
[3] gel-type quat. ammonium resin commercially available, styrene-DVB (1%) cross-linked matrix.
[4] macroreticular quat. ammonium resin commercially available styrene-DVB (3%) cross-linked matrix.

The above data show the unexpected improvement in the ability of the hybrid resin to decolorize sugar solutions. In particular, the hybrid resins E and F lasted for 235 and 269 bed volumes, respectively, (to a given endpoint) while related gel and macroreticular resins lasted only for 168 and 190 bed volumes, respectively, to the same endpoint. The decolorization data is obtained as follows:

The color is monitored colormetrically at 420 m$\mu$. The influent sugar is light cane (approx. 55 Brix) off of activated carbon beds at Sucrest Sugar Co. The conditions of the column runs are as follows:

| | |
|---|---|
| Treatment temperature | 70° C |
| Treatment flow rate | 1.25 gal/ft$^3$/min |
| Bed size | 30 mls. |
| Mesh size | 20–40 standard screen |
| Endpoint | 40% color leakage |
| Regeneration temperature | 70° C |
| Regeneration flow rate | 0.25 gal/ft$^3$/min |
| Regeneration level | 60 lb/ft$^3$ of NaCl (10%) |

EXAMPLE 13 a. Preparation - Acrylic Hybrid Copolymer

In a one-liter, three-necked flask equipped with a mechanical stirrer, a condenser and a thermo-watch-thermometer combination is placed 114.13 g. of a 20% divinylbenzene-(DVB)-styrene macroreticular copolymer (−30 +70 mesh) and 216.64 g. of tap water. To this is added with rapid stirring 30 g. of a 10% DVB-methylacrylate solution in which is dissolved 1.44 g. of benzoyl peroxide. The reaction mixture is stirred rapidly and heated at 80° C. for 3 hours and the temperature increased to 95° C. for 2 hours. The mixture is cooled and the copolymer is isolated by filtration, washed with 600 ml. of methanol and dried in a steam oven (75° C.) until a constant weight of hybrid copolymer is achieved to give 133.40 g. (92.55%) of product.

b. Acrylic Hybrid Copolymer Hydrolysis

In a two-liter, three-necked flask equipped with a mechanical stirrer, a condenser to which is attached a drying tube, an addition funnel, distillation head, and thermometer is added 111.40 g. of the hybrid copolymer described above and 305.65 g. of 55.21% sulfuric acid solution. The solution is distilled for 15 hours with concurrent addition of make-up water. A non-ionic wetting agent is added as necessary to control foaming. When the distillation is complete, the hydrolyzed copolymer is back-washed until the effluent is neutral. The copolymer is isolated by filtration, washed with 600 ml. of methanol, and dried in a steam oven (75°) until a constant weight of copolymer is achieved.

EXAMPLE 13 (continued)

c. Sulfonation of the Styrene Acrylic Hybrid Copolymer

To 100 g. of the hydrolyzed copolymer (KT1492) in a three-liter, three-necked flask equipped with a stirrer, thermometer, and a Barrett-trap to which is connected a condenser with a drying tube was added 600 ml. of 97% sulfuric acid. The mixture is stirred until thoroughly mixed and is heated at 120° for 6 hours. The mixture is cooled to 50° C. with the aid of an ice bath and water is added dropwise at such a rate as to maintain the temperature at 70°. When 500 ml. of water had been added one half of the liquid layer is drained by means of a filter stick. The washing procedure is repeated three times and the product is backwashed to neutrality.

EXAMPLE 14 a. Preparation of a Vinyl Pyridine Hybrid Copolymer

In a one-liter, three-necked flask equipped with a mechanical stirrer, a condenser, and a thermometer is placed 107.6 g. of a 3% DVB-styrene macroreticular copolymer (−30, +70 mesh, 0.56 porosity) and 206 g. of water. To this mixture is added with rapid stirring 30 g. of a 3% DVB-2-vinylpyridine solution in which is dissolved 1.37 g. of benzoyl peroxide. The reaction mixture is stirred rapidly at 80° for 3 hr. and at 95° for 2 hr. The resulting mixture is cooled and the copolymer is isolated by filtration, washed with 600 ml. of methanol and dried to a constant weight at 75° to give 133.7 g. (97.1%) of product.

In an alternative embodiment of the invention resins having mixed functionalities are prepared in a certain manner to give products which are thermoregeneratable. Thus, for example, a resin having weak acid and weak base functionalities is prepared in a manner which is totally novel and which is thought to be, at least in part, responsible for some of its very unusual properties. The method and exact nature of achieving this structure are very important. In a typical example, a macroreticular styrene-divinylbenzene (DVB) copolymer is added to a given quantity of water and the mixture is stirred. To the resulting mixture is added a methyl acrylate-benzoyl peroxide-DVB solution. The organic liquid is taken up by the copolymer principally by capillary action thus filling the voids of the copolymer. The added solution is then polymerized thermally. The resulting hybrid copolymer is pictured as being composed of two different types of copolymer occupying separate and discrete regions within the copolymer. In a representative case, the styrene-DVB macroreticular intermediate, after imbibation or absorption of the methyl acrylate-DVB solution, is chloromethylated resulting in chloromethylation of the aromatic moities. This is followed by basic aminolysis (dimethylamine -NaOH) which results in the substantially simultaneous aminolysis of the chloromethyl groups and hydrolysis of the ester linkages to weak carboxylic acid functionality. This resin is considerably different from the so-called "snake cage resins" which contain closely associated acidic and basic functionalities. Snake cake resins, in contrast, are prepared by a direct actual neutralization process. For example, in snake cage resins, a given amount of acrylic acid (not the ester) is added to an ion exchange resin already containing the weak base functionality.

EXAMPLE 15

Preparation of Hybrid Weak Base - Weak Acid Resin

Part A. Copolymer Synthesis and Preparation

An aqueous phase of 855.5 g. of tap water is used. The water and 268 g. of a styrene-DVB (4% DVB) macroreticular resin are added to a flask and rapidly stirred. An organic phase is prepared and premixed, said organic phase comprising 352.2 g. of methyl acrylate, 59.8 g. of divinylbenzene (DVB - 55%, balance essentially ethylvinylbenzene) and 4.12 g. of AIBN (azobisisobutyronitrile) and the organic phase is added to the rapidly stirred aqueous bead slurry. The resulting mixture is stirred at room temperature about two hours or until all of the methyl acrylate monomer mixture has been absorbed by the copolymer. The resulting mixture is then heated at 70° C. for 4 hours and at 85° C. for 2 hours. The resulting hybrid resin is then washed with 3 × 100 ml. portions of water drained, and dried in a steam oven. The yield is quantitative and the particle size is governed essentially by the particle size of the starting macroreticular copolymer.

| Part B. Chloromethylation | |
|---|---|
| a. Copolymer slurry | |
| 288 g. | hybrid copolymer |
| 235 g. | chloromethyl ether (CME) |
| 200 g. | ethylene dichloride |
| b. Catalyst Solution | |
| 127 g. | Chloromethyl ether (CME) |
| 160 g. | aluminum chloride |
| c. 240 ml. (1896 g.) | anhydrous methanol |
| d. 45.0 g. 50% NaOH | |

The copolymer slurry is charged to a 5000 ml. 4 neck flask fitted with two stirrers, thermometer and reflux condenser with a drying tube. The slurry is heated to 30°–32° C. with stirring and held at that temperature for 2 hours. While the copolymer is swelling, the catalyst solution is prepaid by charging the CME to a 500 ml. 3-necked flask fitted with a stirrer, thermometer and drying tube and cooled to 0°–5° C. The $AlCl_3$ is then added to the CME with stirring, in small portions, keeping the temperature below 25° C. and stirring continued until each portion dissolves. After swelling the copolymer, the temperature is increased to 35° C. and the catalyst solution added to the reaction mixture over a 3 hour period while maintaining the reaction temperature between 35° to 39° C. Upon completion of the addition the temperature is increased to 49–51° C. and held for 4 hours. The reaction mixture is then cooled to 0°–5° C. and the mixture added to 500 ml. of cold methanol (0°–5° C) with vigorous stirring at such a rate that the quench temperature does not exceed 50°. The quench slurry is stirred for 1 hour. The quench solution is removed with a filter stick and 500 ml. of fresh methanol is added with stirring. Stir for 1 hour and then siphon. The yield is 552.2 g. (64% solid)

| Part C. Aminolysis | |
|---|---|
| Charge 552.5 g. | chloromethylated intermediate |
| 390 g. | tap water |
| 360 g. | 50% sodium hydroxide |
| 541 g. | 40% aqueous dimethylamine |

The intermediate, water and caustic are added to a 2 l. Parr bomb. The mixture is cooled to 0° C. and the dimethylamine then added. The bomb is sealed, stirred for 45 minutes at room temperature and heated at 65° C. for 4 hours. At this point the reaction mixture is stripped by gradually increasing the temperature from 65° C. to 100° C. over 8 hours while maintaining a constant reaction volume. The mixture is cooled to room temperature and washed in a backwash tower until the effluent is neutral, ph 7-8. The yield is 919 g. (36.6% solids) of aminated and hydrolyzed product, i.e., a product having weak base tertiary amine functionality and also carboxylic acid functionality.

A product prepared as above typically has a weak base capacity of about 2.37 meq./g. and a weak acid capacity of 2.56 meq. (milliequivalents)/g. The product is examined for its ability to desalinate salt water containing about ~250 ppm sodium chloride. A column containing 16 ml. of the resin 43.8% solids was exhausted at 25° C. with the saline solution at various flow rates from 2 cc per minute to 6 cc per minute. Regeneration was achieved by passing ~530 ppm, salt solution through the resin at 85°–90° C. at various flow rates. Representative data reveals that water containing ~530 ppm sodium chloride can be effectively desalinated to ~178 ppm quality water. The resin is effectively regenerated with 530 ppm water at 85°–90° C.

EXAMPLE 16.

Preparation of Hybrid Weak Base - Weak Acid Resin

A 3-neck round bottom flask equipped with stirrer, condenser and thermometer is charged with 600 g. of $H_2O$ and 150 g. of a macroreticular styrene- 4% DVB copolymer. To this stirred reaction mixture is then added over an 8 minute period, a solution containing 94.5 g. of methyl acrylate, 5.5 g. of 54.9% DVB and 4 g. of benzoyl peroxide. The resultant mixture is stirred 30 minutes and then heated to 70° C. for 20 hours. After cooling, and filtering the beads, the latter is washed 4 times with 500 cc of methanol and subsequently is dried to afford 242.4 g. of white spherical hybrid beads. The dried beads are subsequently heated at 60° C. with 1250 cc of ethylene dichloride (EDC) for 16 hours. The EDC is filtered off and the beads are washed once with 1 l. of EDC and twice with 500 cc of methanol. After drying the beads weigh 207.2 g.

50 g. of EDC washed and dried resin from above is swelled with 120 cc of EDC and 94.2 g. of chloromethyl ether (CME) for 1 hour at room temperature in a 3-neck round bottom flask equipped with stirrer, reflux condenser and drying tube. This slurry is then cooled to 0° C. and a solution of 63.9 of $AlCl_3$ in 50.7 g. of CME is added to it with agitation over a 2 hour period with the temperature maintained at 0° C. The resultant mixture is stirred at 0° C. for 3 hours and subsequently added to 300 ml. of methanol at 5°–10° C. slowly so the temperature of the methanol solution does not exceed 25° C. The methanol is siphoned from the beads and the beads washed three times with an equal volume of water. The beads are diluted with water, neutralized with 0.5 g. of $Na_2CO_3$ and filtered to give 111 g. of wet beads (60% solids) containing 16.81% chlorine after drying.

The wet chloromethylated beads from the above are diluted with water and heated to azeotrope off EDC. The beads are filtered and diluted with 60 cc of water in a 500 ml. 3-neck round bottom flask equipped with a stirrer, thermometer and dry ice condenser. To this stirred mixture is added 60 g. of 50% NaOH and 169 g. of aqueous dimethylamine. The mixture is heated to reflux for 4 hours. The dry ice condenser is replaced with a distillation condenser and the excess dimethylamine stripped off until the reaction mixture reaches 104° C. The subsequent mixture is refluxed for 2 hours and cooled to room temperature. The resin is then washed with water until the pH of the effluent is less than 8. The wet yield of beads is 131.6 g. (52.61% solids). A sample of the dried resin contained 1.7% C and 4.6% N. A bed of 15 cc of the wet beads had a thermal salt (NaCl) capacity at pH 7.09 of 38.2 mg. NaCl

EXAMPLE 17.

Preparation of Hybrid Weak Base - Weak Acid Resin By Emulsion Process

To a 5 liter 3 neck round bottom flask equipped with stirrer, condenser and thermometer was charged 999 g. of $H_2O$ and 288 g. of Triton X-200 (28% aqueous dispersion) surfactant, the sodium salt of an alkylaryl polyether sulfonate. The mixture was stirred 15 minutes and then diluted with a solution containing 32.35 g. of divinylbenzene, 5.98 g. of diethylene glycol divinyl ether, 759 g. of methyl acrylate and 15.96 g. of benzoyl peroxide. The resultant mixture was stirred 30 minutes and then 300 g. of a macroreticular styrene-4% DVB copolymer added. After stirring 30 minutes, the excess emulsion (1261 g.) was siphoned from the flask. The beads were then diluted with 999 cc of sat'd. NaCl and stirred 15 minutes. The salt solution was siphoned off and the beads diluted with 525 g. of sat'd. NaCl solution, 375 g. of $H_2O$ and 35 g. of NaCl. The resultant mix was then heated with stirring at 50° C. for 20 hours. The batch was subsequently heated to 95° C. for 2 hours, cooled and washed with water. The beads were oven dried to yield 762.5 g. of white large spherical beads.

400 g. of the hybrid resin from above was chloromethylated with 920 g. of CME, 850 cc of EDC and 480 g. of $AlCl_3$ by the procedure described in Example 16 above except that the $AlCl_3$ was added to the reaction mix in small increments over a 2 hour period. A sample of the final chloromethylated resin after drying contained 13.1% Cl.

The wet chloromethylated resin from above was aminolyzed and hydrolyzed with 480 cc of $H_2O$, 480 g. of 50% NaOH and 1352 g. of 40% of dimethylamine by the procedure described in Example 16 above. The final wet resin weighed 1374.3 g. and was 35.92% solids. A dry sample analyzed as 5.85% Cl and 4.00% N. The thermal salt capacity of a 15 cc bed of the resin at pH 5 was 79 mg. of NaCl.

EXAMPLE 18

Preparation of Hybrid Weak Base - Weak Acid Resin by Modified Emulsion Process A 2 liter 3-neck round bottom flask equipped with a stirrer, condenser and thermometer was charged with 120 g. $H_2O$ and 13 g. of Triton X-200 (28% aqueous dispersion) surfactant. After stirring 15 minutes, the flask contents was diluted with 210 g. of a monomer solution containing ethyl acrylate, 2.25% DVB, 0.75% diethylene glycol divinyl ether and 30% benzoyl peroxide. The resultant mix was stirred 15 minutes and then 105 g. of a macroreticular styrene - 4% DVB copolymer was added and the batch again stirred for 30 minutes. To this stirred reaction mix was then added 100 cc of sat'd NaCl solution to break the emulsion. The mixture was then siphoned (410 ml. of siphonate) and the beads diluted with 300 cc of saturated NaCl solution. The resultant mix was heated at 55° C. for 20 hours and at 95° C. for 2 hours. The beads were washed with water and oven dried to afford 301.5 g. of white spherical beads.

100 g. of the dried hybrid beads from above were chloromethylated and aminolized by the procedure described in Example 17 above. A sample of the chloromethylated beads analyzed as 8.46% Cl. The final resin after adjustment to pH 5 weighed 326 g. wet and was 34% solids. A dry sample analyzed as 2.84% and 1.69% Cl. The NaCl capacity of a 15 cc bed of the resin at pH 5 was 58 mg.

EXAMPLE 19.

Preparation of Hybrid Weak Base - Weak Acid Resin - Extender Variation

The extender process is the same as the original process above (Ex. 15) except that the organic phase is diluted with an extender such as DIBK (di-isobutyl ketone) before adding the organic phase, the copolymer and water slurry. Normally, the DIBK constitutes about 10% of the organic phase by weight. Normally, only about 90% of the total monomer charge (methyl acrylate, DVB, diethyleneglycoldivinylether) is incorporated into the final dry product giving a net hybrid yield of about 92-95%. The DIBK is steam stripped from the batch product prior to cooling and washing the product.

In a specific embodiment, a 2 l. 3-neck round bottom flask equipped with stirrer, thermometer and condenser was charged with 600 g. of $H_2O$ and 150 g. of macroreticular - styrene -4% DVB copolymer beads. After stirring for about 30 minutes, the stirred mixture was diluted with a solution containing 190 g. of methyl acrylate, 8.3 g. of divinylbenzene solution (54.3% DVB), 1.5 g. diethylene glycol divinyl ether, 4 g. of lauroyl peroxide and 130 g. of di-isobutyl ketone (DIBK). After stirring for 30 minutes, the reaction mix was heated with stirring at 60° C. for 20 hours and at 95° C. for 2 hours. The DIBK was then azeotroped off and the beads washed and dried to afford 345.1 g. of large white hybrid beads.

100 g. of the dried beads from above were chloromethylated and aminolyzed by the procedure given in Example 17 above. The chloromethylated intermediate contained 12.40% Cl. The final hybrid resin weighed 322.2 g. wet (38.42% solids). A dried sample analyzed as 5.8% Cl and 4.0% N. The NaCl capacity of a 15 cc bed of the resin at pH 5 was 60 mg.

EXAMPLE 20.

Preparation of Resin (based on vinylbenzylchloride - VBC)

A VBC-6% DVB-40%, MIBC (methyl isobutylcarbinol) copolymer is prepared using a suspension polymerization technique. The copolymer is then filled with monomer mix using a process as follows. Nineteen g. of Triton X-200 surfactant (28% aqueous dispersion) and 120 ml $H_2O$ is charged to a 2-liter reaction flask equipped with a mechanical stirrer, thermometer, reflux condenser, and a heating mantle, and is stirred vigorously for 15 minutes. Monomer mix consisting of 190.0 g. ethyl acrylate, 8.2 g DVB (55.9%), 1.6 g DEGDVE (diethyleneglycoldivinylether), and 4.0 g. AIBN, is then added and the mixture is stirred for 15 minutes. An additional 333.3 ml. of $H_2O$ is added and the mixture is stirred for 15 minutes. The VBC copolymer is then added and the slurry stirred for 1 hour. One hundred ml. of saturated NaCl solution is then added over a 5 minute period, the mixture is stirred for 15 minutes and is then heated to 75° over 1 hour and is held at 75° for 20 hrs. The reaction mixture is then heated to 95°, held at 95° for 2 hours, cooled and washed. The yield, based on dry resin, is 282 g., indicating 85% incorporation of monomer. The resin is then treated with 300 ml. $H_2O$, 400 ml. NaOH (50%) and 635 ml. DMA (40%) and refluxed at 45° for 4 hours. The excess DMA is then distilled off, the flask is heated to 105° and held at 105° for 2 hours. The reaction mixture is then cooled, and the resin washed until effluent is neutral. The resin is evaluated and has a thermal salt capacity of 56.7 mg./15 ml. of resin at pH = 5.0.

The ratio of the gel acrylate weak acid phase to the macroreticular weak base phase in the specially prepared resins can vary over a wide range as with the other hybrid resins in this application. Ordinarily, however, the weak acid (acrylic acid phase) will vary from about 1/5 to 3 times the weak base macroreticular phase by weight. In other respects, the hybrid weak acid weak base resin can be prepared in accordance with all the variations taught in the present case with respect to the other hybrid resins. Preferably, however, the crosslinker level in the weak acid-weak base hybrid will be about 1/2 to 10% crosslinker level in both (each) phases with 3 to 5% being preferred in the host weak base macroreticular phase and about 5 to 8% crosslinker being preferred in the gel acrylic phase.

The above-detailed description has been given for clearness of understanding only. No unnecessary limitations should be understood therefrom, as modifications will be obvious to those skilled in the art. While the examples given hereinabove deal with addition type polymers, the present invention also embraces other types of polymers which may form one or more of the components of the hybrid copolymers and/or resins. Thus condensation polymers, or mixtures of condensation polymers and addition polymers, may be used as the host polymer or phase or as the gel fill or gel phase.

In an alternate embodiment of this invention the host polymer may have weak acid functionality and the guest or filling polymer or phase may have weak base functionality.

EXAMPLE 21

1. Preparation of Styrene/Divinyl Benzene (DVB) Hybrid Copolymer Containing Dimethyl Itaconate (DMI)

The hybrid copolymer is prepared by the following procedure. Styrene/DVB (100 g.) and 400 g. tap water are introduced into a 1 liter, 3-necked flask fitted with mechanical stirrer, reflux condenser, $N_2$ inlet tube, thermometer, heating mantle, and thermowatch assembly. To the flask is added a premixed solution of 173.96 g. (DMI), 7.62 g. DVB (53.9% assay), 1.31 g. diethylene glycol divinyl ether (DEGDVE), 20.27 g. diisobutyl ketone (DIBK), and 3.6 g. lauroyl peroxide over a period of 1/2 hour with stirring. The stirring is continued for an additional ½ hour followed by heating the mixture to 60° C for 20 hours. After azeotropic distillation of the DIBK, the copolymer is isolated, washed with water, and oven dried, yield is 243.6 g. (86.2%).

2. Chloromethylation Procedure

The hybrid copolymer is chloromethylated in a 2 liter, 3-necked flask equipped with mechanical stirrer, reflux condenser, thermometer, and external cooling bath. The hybrid copolymer (143.6 g.), 999 ml ethylene dichloride (EDC), and 746 g. of chloromethyl ether (CME) are stirred in the flask for 2 hours, cooled to 0° – 5° C, and 332 g. of $AlCl_3$ added incrementally over a two hour period while maintaining the temperature at 0°–10° C. Upon completion of the $AlCl_3$ addition, the temperature is raised to 25° C and held for 3 hours. The reaction is quenched by pouring into 1 liter of chilled methanol while maintaining the temperature below 35° C. The mixture is stirred 15 minutes, stick filtered, and the resin washed with 1 liter of methanol. Removal of the methanol from the resin is followed by the addition of 1 liter of DI water and addition of 50% NaOH to make the solution basic. After heating to 100° C for 15–20 minutes, the solution is cooled and stick filtered. An analytical sample of the resin contains 14.78% Cl.

3. Aminolysis-Hydrolysis of the Chloromethylated Hybrid Copolymer

The entire chloromethylated hybrid copolymer sample is placed in a 2 liter, 3-necked flask fitted with mechanical stirrer, thermometer, dry ice condenser, and heating mantel. To the flask is added 120 g. cracked ice, 120 g. of 50% NaOH, and 338 g. of 40% dimethylamine (DMA). The mixture is stirred at ambient temperature for 1 hour, then heated to reflux for 4 hours and finally to ~100° C for 2 hours to remove the excess DMA (dry ice condenser is replaced with water cooled condenser for this last step). The product is isolated, washed with water, and stored wet. Analysis gives 9.9% Cl and 4.5% N. General properties of the resin are measured as 49.41% solids, 3.10 meq/g. total anion exchange capacity (TAEC), and 1.52 meq/g. cation exchange capacity (CEC). Thermal salt capacities (mg NaCl/15 cc.) are measured at pH 6-8 using a 540 ppm NaCl solution. Measured values are 46.61 (pH 6), 77.81 (pH 6), 77.81 (pH 7), and 43.95 (pH 8).

We claim:

1. A heterogeneous hybrid ion exchange resin having two relatively independent phases comprising a hybrid copolymer in which there are present ion exchange functional groups, the hybrid copolymer containing a crosslinked macroreticular porous host or base copolymer phase of a polyunsaturated monomer and a monoethylenically unsaturated monomer, said macroreticular copolymer being at least partially filled in the macropores with a crosslinked gel copolymer phase of a polyunsaturated monomer and a monoethylenically unsaturated monomer.

2. A heterogeneous hybrid ion exchange resin according to claim 1 in which the gel copolymer phase is present in the amount of about 5 to 300 parts by weight per 100 parts by weight of macroreticular host polymer phase.

3. A heterogeneous hybrid ion exchange resin according to claim 2 in which the gel copolymer phase is present in the amount of about 10 to 200 parts by weight per 100 parts by weight of macroreticular host polymer phase.

4. A heterogeneous hybrid ion exchange resin according to claim 2 in which the crosslinking density of the gel phase is less than that of the macroreticular copolymer phase.

5. A heterogeneous hybrid ion exchange resin according to claim 2 in which the crosslinking density of the gel phase is greater than that of the macroreticular copolymer phase.

6. A heterogeneous hybrid ion exchange resin according to claim 2 in which the resin has cationic exchange activity.

7. A heterogeneous hybrid ion exchange resin according to claim 2 in which the resin has anionic exchange activity.

8. A heterogeneous hybrid ion exchange resin according to claim 1 comprising an ion exchange resin having weak acid and weak base functionalities, the weak base phase portion comprising the macroreticular portion of the resin and the weak acid portion comprising the gel portion of the resin which at least partially fills the macropores of the macroreticular phase.

9. A heterogeneous hybrid ion exchange resin according to claim 8 wherein the weak acid gel phase is present in a ratio of about 1/5 to 3 times the amount of the macroreticular host phase.

10. A heterogeneous hybrid ion exchange resin according to claim 9 wherein the macroreticular phase contains a weak base tertiary amine functionality on a styrene divinylbenzene matrix and the gel weak acid phase is a gel acrylic or carboxylic acid phase.

11. A heterogeneous hybrid ion exchange resin according to claim 8 wherein the gel acrylic acid phase is present in the amount of about 5 to 300 parts by weight per 100 parts by weight of the macroreticular weak base host polymer phase.

12. A process for making a heterogeneous hybrid ion exchange resin in particulate form having two relatively independent phases which comprises adding to an aqueous suspension of a macroreticular copolymer having a significant degree of macroporosity a liquid monomer mixture of a monomer containing at least one polymerizable double bond and a monomer containing at least two polymerizable double bonds, which liquid monomer mixture is imbibed into the macropores of the macroreticular copolymer, polymerizing said imbibed liquid monomer mixture within the macropores of said macroreticular copolymer to form a heterogeneous hybrid copolymer, and thereafter introducing ion exchange functional groups into the heterogeneous copolymer to form a heterogeneous hybrid ion exchange resin.

13. A process for making a heterogeneous hybrid ion exchange resin having both weak acid and weak base ion exchange functionalities which comprises adding to an aqueous suspension of a macroporous styrene - divinylbenzene macroreticular host copolymer a liquid monomer mixture of methyl acrylate - divinylbenzene, which liquid mixture is imbibed into the macropores of the host copolymer, polymerizing the liquid monomer mixture within the macropores of the host copolymer to form a hybrid copolymer, chloromethylating the resultant hybrid copolymer to convert the macroreticular phase to a chloromethylated intermediate, and finally subjecting the chloromethylated hybrid copolymer to basic aminolysis with dimethylamine and sodium hydroxide whereby the chloromethylated macroreticulated portion of the hybrid copolymer is converted to weak base tertiary amine functionality and the methyl acrylate ester portion is hydrolyzed to weak acid functionality.

14. Process according to claim 13 wherein the gel weak acid portion is present in an amount of about 5 to 300 parts by weight per 100 parts by weight of the macroreticular copolymer or host phase.

* * * * *